United States Patent [19]
Dragone

[11] Patent Number: 5,629,991
[45] Date of Patent: May 13, 1997

[54] METHOD FOR REDUCING BIREFRINGENCE IN OPTICAL GRATINGS

[75] Inventor: Corrado Dragone, Little Silver, N.J.

[73] Assignee: Lucent Technologies Inc., Murray Hill, N.J.

[21] Appl. No.: 514,038

[22] Filed: Aug. 11, 1995

[51] Int. Cl.$^6$ .................................................. G02B 6/26
[52] U.S. Cl. ........................ 385/11; 385/28; 385/29
[58] Field of Search ................................. 385/11, 28, 29, 385/129, 41; 356/33

[56] References Cited

U.S. PATENT DOCUMENTS

| | | | |
|---|---|---|---|
| 4,207,000 | 6/1980 | Miller | 356/33 |
| 4,444,460 | 4/1984 | Stowe | 350/96.19 |
| 5,002,350 | 3/1991 | Dragone | 350/96.15 |
| 5,136,671 | 8/1992 | Dragone | 385/46 |
| 5,341,444 | 8/1994 | Henry et al. | 385/11 |
| 5,375,184 | 12/1994 | Sullivan | 385/129 |
| 5,467,415 | 11/1995 | Presby | 385/129 |
| 5,495,544 | 2/1996 | Smith et al. | 385/41 |

*Primary Examiner*—Rodney B. Bovernick
*Assistant Examiner*—Yisun Song
*Attorney, Agent, or Firm*—Stuart H. Mayer

[57] ABSTRACT

A method is provided for reducing the polarization shift between different modes of an optical signal propagating in an optical grating having a plurality of waveguides extending in a common plane. The method includes the step of imparting curvature to the optical grating along a line that traverses the plurality of waveguides in a direction that is substantially perpendicular to the direction in which the optical signal propagates. The curvature varies in a nonuniform manner along the line to which it is imparted. The curvature may vary in a substantially linear manner along this line, which in some cases may define a symmetry axis of the grating. Sufficient curvature may be imparted to substantially eliminate the polarization shift. The curvature may be imparted by flexing the optical grating at two contact points respectively located near a longest and shortest of the plurality of waveguides.

10 Claims, 5 Drawing Sheets

5,629,991

METHOD FOR REDUCING BIREFRINGENCE IN OPTICAL GRATINGS

FIELD OF THE INVENTION

This invention relates to an optical grating which is capable of optical switching, multiplexing, and demultiplexing functions. More particularly, this invention relates to an optical interconnection apparatus that has an increased passband width.

BACKGROUND OF THE INVENTION

Optical devices such as waveguides, gratings, and switches, for example, are typically fabricated in layers of silica deposited on silicon. One problem that occurs when employing these materials is that strain birefringence arises because of the large thermal expansion coefficient of silicon relative to silica. As a result of this difference in expansion coefficients, large compressive strains are produced in the silica layers after the requisite annealing step is performed during the fabrication process. The resulting birefringence caused by the strains produce different propagation constants for the TE and TM waveguide modes. Because the modes have different propagation constants, an optical signal propagating through a device is split into two components corresponding to the TE and TM modes. The components are characterized by different wavelengths of maximum transmission and the difference, which is referred to as the polarization shift, is typically about 0.3 nm at a wavelength of 1.5 microns. A polarization shift of this magnitude is too large for many applications in which optical devices are employed. For example, frequency routing devices having channel spacings of less than 2 nm are required for long-haul or local area networks. For such purposes the routing device typically should have a polarization shift of less that about 0.1 nm. Accordingly, it is desirable to reduce the polarization shift in optical devices.

SUMMARY OF THE INVENTION

The present invention provides a method for reducing the polarization shift between different modes of an optical signal propagating in an optical grating having a plurality of waveguides extending in a common plane. The method includes the step of imparting curvature to the optical grating along a line that traverses the plurality of waveguides in a direction that is substantially perpendicular to the direction in which the optical signal propagates. The curvature varies in a nonuniform manner along the line to which it is imparted. The curvature may vary in a substantially linear manner along this line, which in some cases may define a symmetry axis of the grating. Sufficient curvature may be imparted to substantially eliminate the polarization shift. The curvature may be imparted by flexing the optical grating at two contact points respectively located near a longest and shortest of the plurality of waveguides.

DETAILED DESCRIPTION

The present invention is applicable to an optical grating, which is defined as a plurality of waveguides having unequal lengths that provide a plurality of parallel optical pathways. Typically, the grating is designed so that adjacent waveguides all differ in length from one another by a constant predetermined amount. While one of ordinary skill in the art will recognize that the present invention is equally applicable to any integrated optical grating, the present invention will be described in terms of an optical grating that is a part of a conventional frequency routing device such as disclosed in U.S. Pat. Nos. 5,002,350 and 5,136,671.

Figure 1:
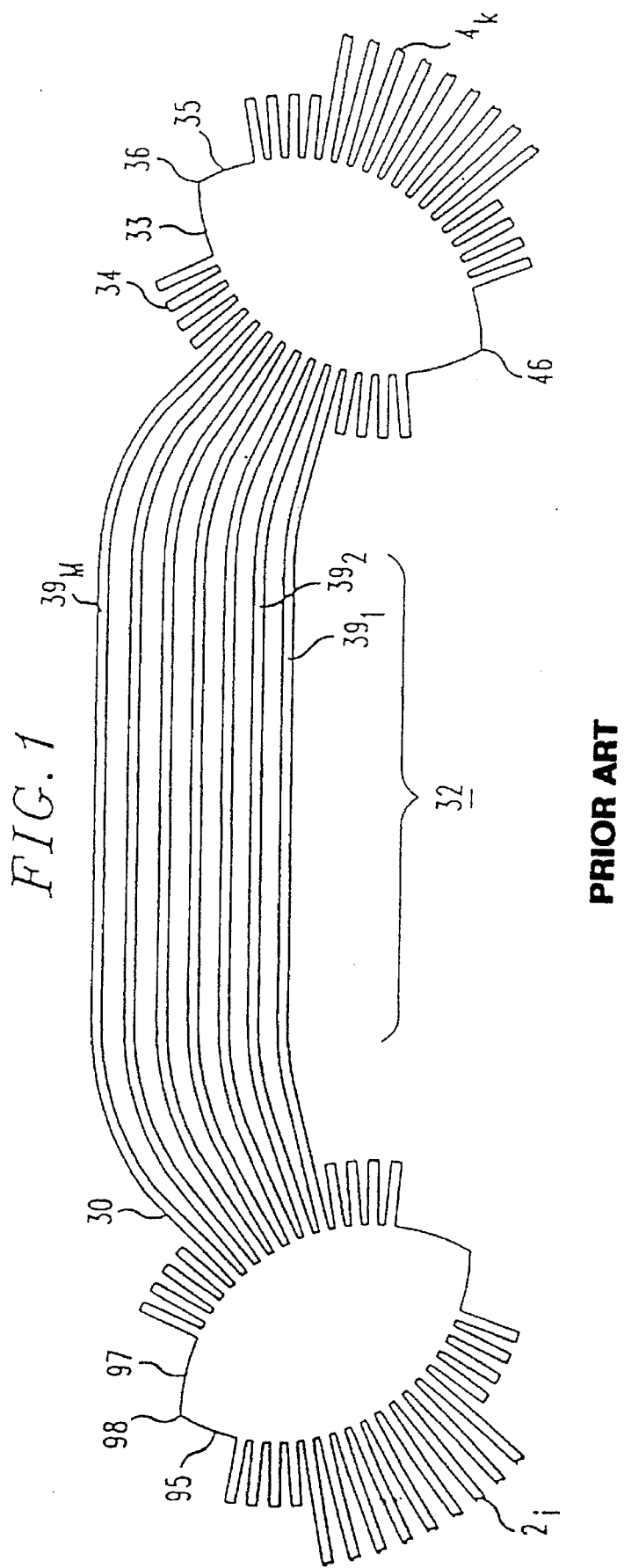
FIG. 1 illustrates an example of a conventional optical frequency routing device.

FIG. 1 shows the pertinent details of a conventional frequency routing device. The frequency routing device contains a plurality of input ports $2_i$, $i=1, 2, \ldots, N$ connected to the input circle 95 of a free space region 98. A plurality of output waveguides 30 extends from the output circle 97 of the free space region 98 and is connected to an optical grating 32. The optical grating 32 comprises a plurality of unequal length waveguides $39_1, 39_2, \ldots 39_M$ which provides a predetermined amount of path length difference to a corresponding plurality of input waveguides 34 connected to the input circle 33 of another free space region 46. The waveguides $39_1, 39_2, \ldots 39_M$ that form the optical grating 32 are denoted sequentially from the shortest waveguide $39_1$ to the longest waveguide $39_M$. The output circle 35 of the free space region 46 is connected to a plurality of output ports $4_k$, $k=1, 2, \ldots, N$. The various input and output ports are formed from waveguides. These frequency routing devices operate as multiplexers and demultiplexers of optical frequencies. Additional details concerning these routing devices are found in the above-referenced patents.

Figure 2:
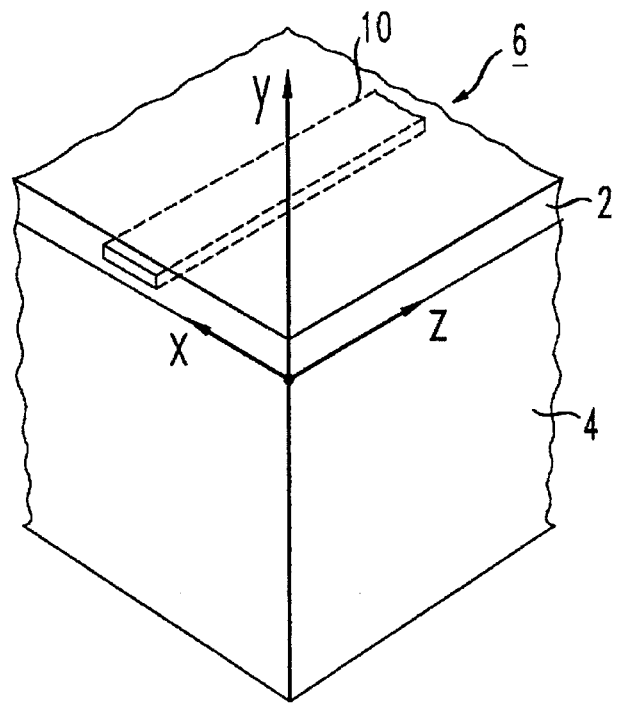
FIG. 2 shows a single waveguide in semiconductor structure.

Before discussing birefringence in optical gratings, the strains in silica structures that give rise to birefringence will be discussed with reference to the simple structure shown in FIG. 2, which is a perspective view of an integrated semiconductor structure 6 composed of a single silica waveguide 10 formed by a core layer imbedded in a cladding layer 2 of lower refractive index than the core layer. The silica layer 2 is disposed on a silicon substrate 4. As FIG. 2 indicates, the layers 2 and 4 and the waveguide 10 extend in the x-z plane, with the propagation axis of waveguide 10 extending in the z direction. The electric fields of the TE and TM modes of an optical wave propagating in the waveguide 10 in the z-direction are directed along the x and y axes, respectively. Silicon-based devices such as the structure 6 undergo an annealing step during their fabrication and as a result of the different thermal expansion coefficients of silica and silicon negative (i.e., compressive) strain arises in the plane of the structure (i.e., the x-z plane) and positive (i.e., dilatation) strain arises in the direction perpendicular to the plane of the structure (i.e., the y-direction). The magnitude of the strain in the y-direction is smaller than the magnitude of the strain in the x-z plane by a factor of roughly 0.38.

The differential strains in the silica material give rise to birefringence. Birefringence in turn gives rise to different propagation constants for the TE and TM modes of an optical wave propagating in the waveguide. The different propagation constants cause the TE and TM modes to experience different phase shifts as they traverse the waveguide. In a frequency routing device, the relative phase shift between the two modes splits each peak appearing in the transmission spectrum into two distinct peaks. The wavelength separation between these peaks is referred to as the polarization shift observed in the transmission spectrum of the optical grating. Accordingly, to reduce the polarization shift the differential strain should be reduced. As discussed below with reference to FIG. 2, the strain differential can be reduced by bending the device in an appropriate manner to provide a compensating strain. For the remainder of this discussion the direction in the plane of the semiconductor substrate that is perpendicular to the direction of optical propagation (i.e., the x direction in FIG. 2) will be referred to as the in-plane transverse direction.

Figure 3:
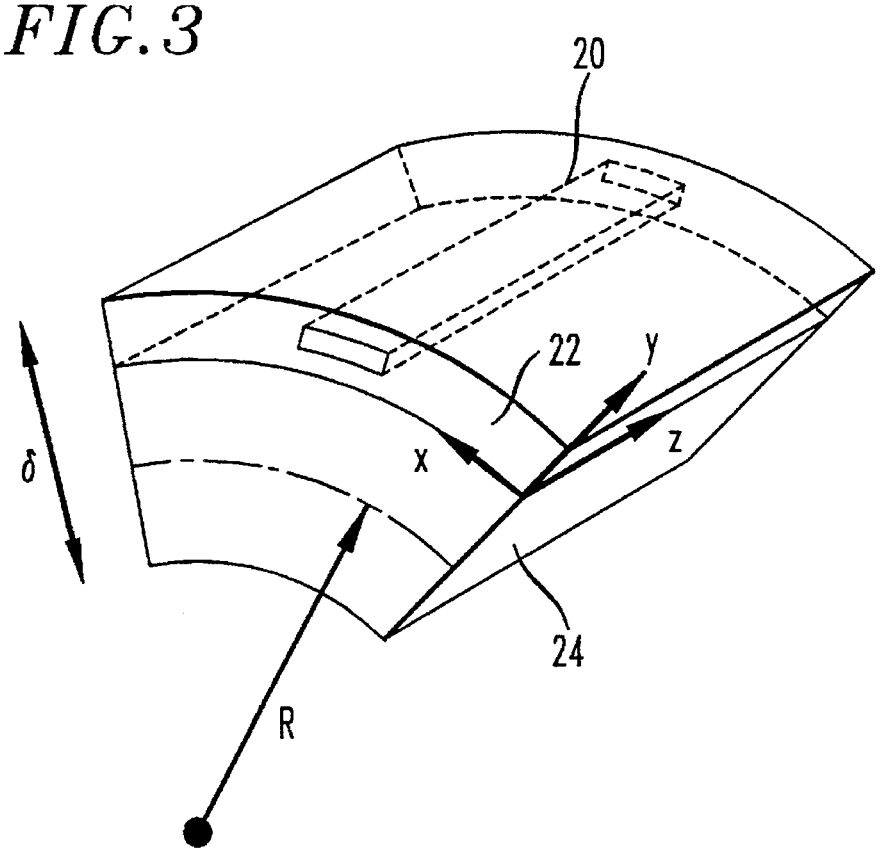
FIG. 3 shows the semiconductor structure of FIG. 2 after having undergone a bending process.

FIG. 3 shows a waveguide 20 formed in a silica layer 22 that is deposited on a silicon substrate 24. The waveguide 20 is similar to the structure shown in FIG. 2 but with a nonzero curvature imparted thereto about an axis approximately parallel to the propagation direction. Birefringence may be reduced by providing a compensating positive strain in the in-plane transverse direction to effectively reduce or cancel the compressive strain. That is, for the particular orientation shown in FIG. 3, to compensate for the compressive strain in the x-direction a positive compensating strain should be applied in the x direction. This positive strain can be applied as illustrated in FIG. 3 by bending the structure to impart a positive curvature C along the in-plane transverse direction, where C is equal to the reciprocal of the radius of curvature R. In principal, such a compensating strain can be provided by imparting uniform curvature to the structure so that the differential strain is eliminated, thus providing an isotropic medium in which the TE and TM modes effectively propagate with the same propagation constant. However, as described below, the inventor of the present invention has discovered that the polarization shift in an optical grating is advantageously eliminated by bending the structure so that different curvatures are imparted to the various waveguides of the grating. That is, the resulting curvature imparted to the entire structure is non-uniform rather than uniform. As detailed below, such non-uniform curvature provides a number of advantages over uniform curvature.

While uniform curvature can in principle reduce or eliminate the polarization shift in optical gratings, such a curvature introduces additional complexities. For example, the amount of uniform curvature that is required to fully compensate for the difference in propagation constants between the TE and TM modes in a given waveguide overcompensates for the negative strain in certain regions of the cladding, causing excess positive strain in these regions. Such excess positive strain is undesirable because silica is less stable under positive strain than it is under negative strain. Accordingly, to provide a sufficient amount of positive strain to eliminate the polarization shift without introducing excess positive strain, the curvature imparted along the in-plane transverse direction should be greater in some locations than in others. Hence, a non-uniform curvature is desirable.

Figure 4:
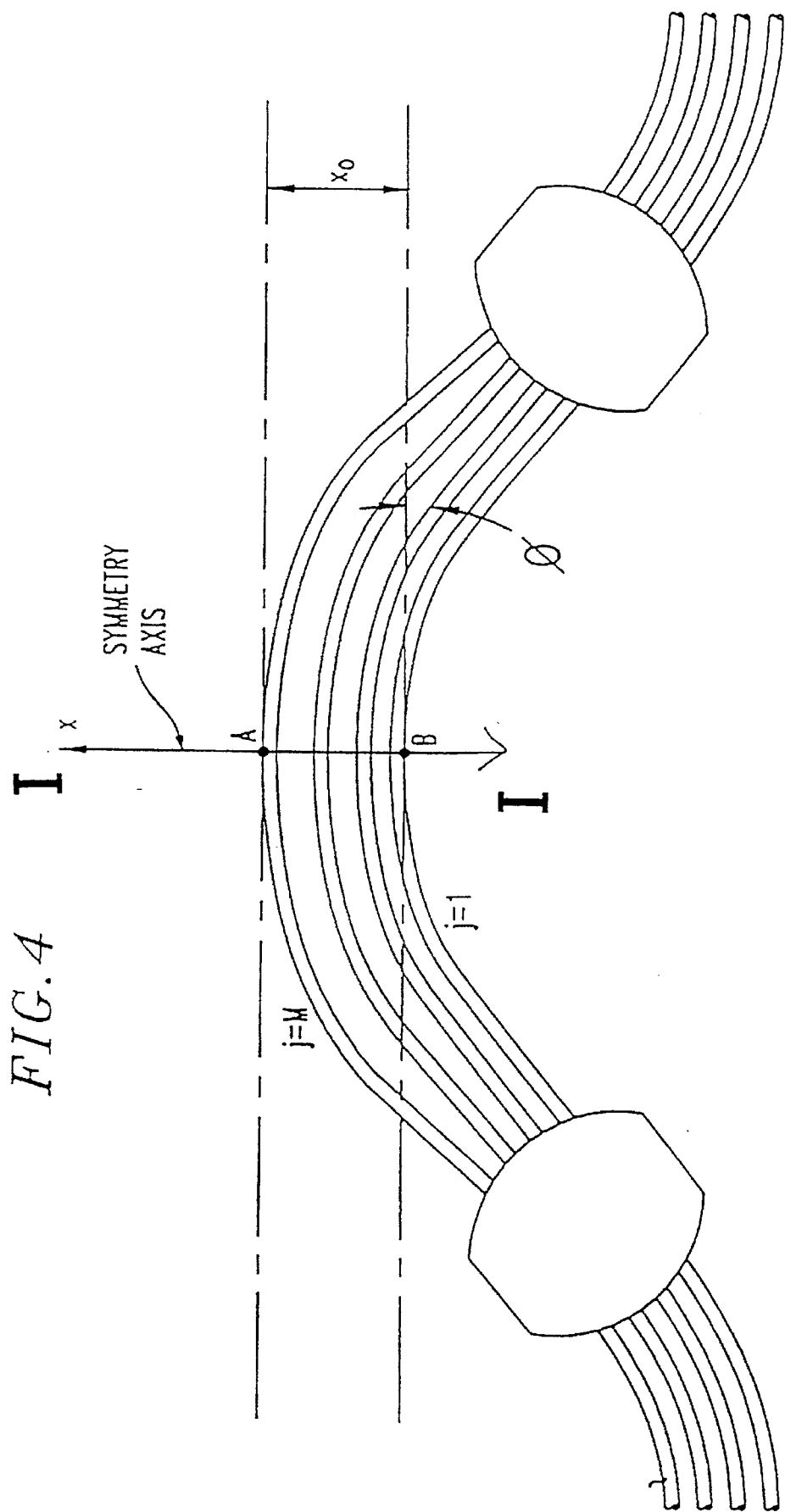
FIG. 4 shows an optical grating that is pan of a frequency routing device in which a so-called in-plane transverse direction is indicated.

The provision of uniform curvature over the entire structure is also undesirable because the waveguides forming the optical grating do not generally extend linearly but rather are curved within the plane of the structure. For example, FIG. 4 shows a conventional frequency routing device similar to that shown in FIG. 1. To eliminate the polarization shift in this device, in accordance with the technique discussed above in connection with FIG. 2, positive curvature should be provided to the device along line A-B, which defines the in-plane transverse direction of the optical grating. It should be noted that because the waveguides of the grating do not extend linearly, the in-plane transverse direction will be different along different portions of the grating. In FIG. 4 the line A-B is shown traversing a symmetry axis of the grating.

If curvature is imparted along the in-plane transverse direction of the grating defined by line A-B, those waveguide sections which form a relatively large angle $\phi$ with respect to the plane perpendicular to the in-plane transverse direction (indicated by line I—I in FIG. 4) will not be significantly affected by the bending process. That is, the differential strain components responsible for birefringence will only be reduced by providing curvature to those waveguide sections that are oriented at a relatively small angle $\phi$. Accordingly, it is not necessary to provide positive curvature along those waveguide sections for which the angle $\phi$ is large since doing so will not substantially reduce the differential strain and hence will not provide any substantial reduction in the polarization shift.

For the following discussion it will be convenient to speak in terms of birefringence rather than differential strains. In an optical grating, the polarization shift can be eliminated without entirely eliminating the birefringence i.e., the relative phase shift between the two modes, and hence without fully eliminating the strain differential that arises between the TE and TM polarization states. Specifically, if the birefringence in waveguide j of the optical grating is denoted by $a_j$, the polarization shift in the grating will be eliminated when the difference in birefringence between adjacent waveguides is the same for all adjacent waveguide pairs. That is, $\delta a_j = a_j - a_{j-1}$ should be a constant for all j.

Referring again to FIG. 4, if positive curvature is provided only in the region where the waveguide sections form a relatively small angle $\phi$ (i.e., in the vicinity of line A-B in FIG. 4), then the birefringence $a_j$ produced in the j-th waveguide is given by $$a_j = \alpha \cdot c_j \cdot p_j \qquad (1)$$

where $\alpha$ is a suitable proportionality constant, $p_j$ is the effective length of the section of waveguide j to which curvature is provided, and $c_j$ is the average value of the curvature provided over the length $p_j$.

If the curvature $c_j$ provided to the waveguides is non-uniform and varies linearly with j, then in accordance with equation (1) the birefringence $a_j$ also will be approximately a linear function of j. Moreover, if $a_j$ is a linear function of j, then $\delta a_j$ is independent of j. That is, the difference in birefringence $\delta a_j$ between all the pairs of adjacent waveguides in the optical grating will be the same, fulfilling the requisite criterion for eliminating the polarization shift. In particular, if the effective length $p_j$ of the waveguide effected by bending is approximately the same for all waveguides and the curvature varies linearly with the waveguide number, then:

$$\delta a_j \cong \frac{C_M}{M-1} p \qquad (2)$$

where M is the total number of waveguides in the optical grating, $C_M$ is the curvature provided to the longest waveguide in the grating, and p is approximately equal to the length of the portion of the central waveguide in the grating to which curvature is provided.

Various methods may be employed to provide the optical grating with a linearly varying curvature along the in-plane direction that is perpendicular to the direction of optical propagation. In fact, providing such a curvature that varies linearly with distance is relatively easy to accomplish because, as is well known from elementary mechanics, when a semi-rigid beam is flexed at both its ends, the curvature imparted thereto varies linearly with distance from either end, assuming no additional external loads are supplied between the ends. Accordingly, the method of the present invention may be conveniently implemented, for example, by any means that imparts curvature to the grating along the in-plane transverse direction by flexing the innermost and outermost waveguides of the optical grating (e.g., points A and B in FIG. 4) without applying an external load to any of the waveguides therebetween. One such method will be described below in connection with the frequency routing device shown in FIG. 5.

Figure 5:
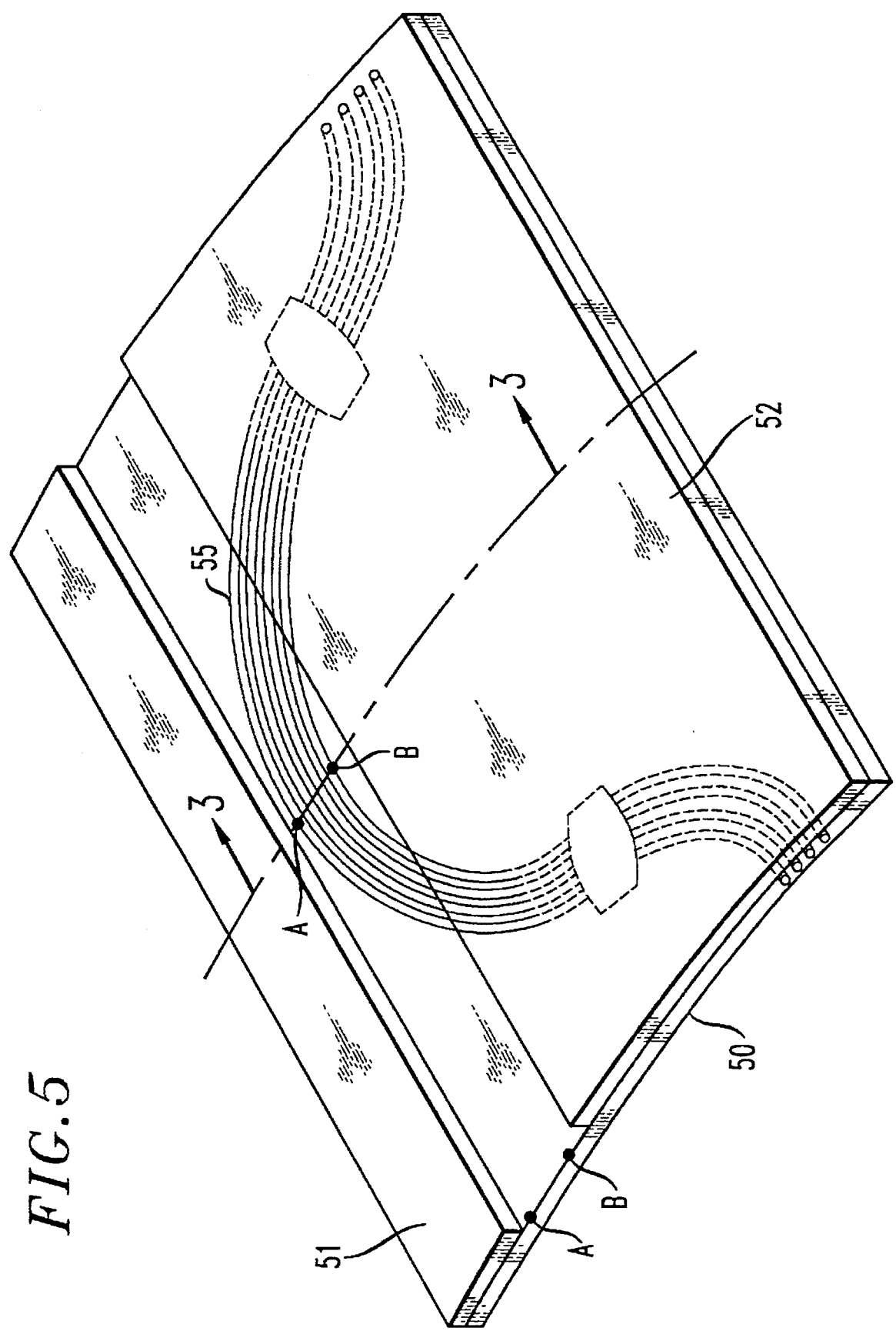
FIG. 5 shows a perspective view of a frequency routing device fixed to two planar elements that may be used to apply curvature to the optical grating in accordance with the present invention.

FIG. 5 shows a perspective view of a frequency routing device fixed to two planar rigid elements 51 and 52 that together with an appropriate support (not shown in FIG. 5) are capable of providing the requisite curvature. As FIG. 5 indicates, the frequency routing device has been fabricated on a larger wafer 50. The planar elements 51 are 52 are situated over the wafer 50 so that the portion of the optical grating 55 to which curvature is to be provided is exposed and does not contact the planar elements 51 and 52. The planar elements 51 and 52 serve to maintain the planar nature of the portion of the frequency routing device that is not to be curved. It is often important to maintain the planar nature of the device so that planar connectors can be subsequently attached thereto. By flexing the two elements 51 and 52 curvature will be imparted to the exposed portion of the optical grating situated between the elements 51 and 52. As noted above, by simply bending the frequency routing device by exerting downward force on the two elements 51 and 52 the curvature imparted to the optical grating 55 will vary in a linear manner along the in-plane transverse direction defined by line A-B.

Figure 6:
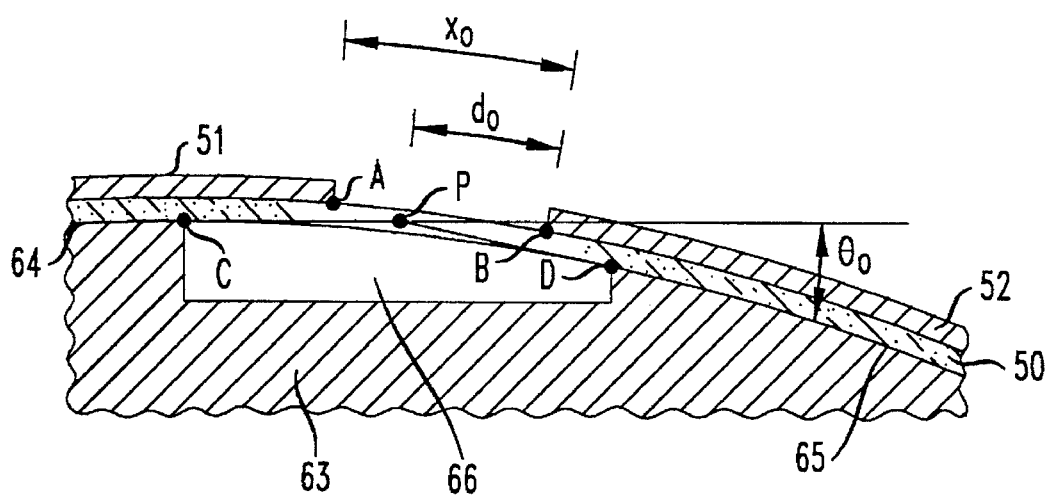
FIG. 6 shows a cross-sectional view of the arrangement shown in FIG. 5 taken along line 3—3.
Figure 7:
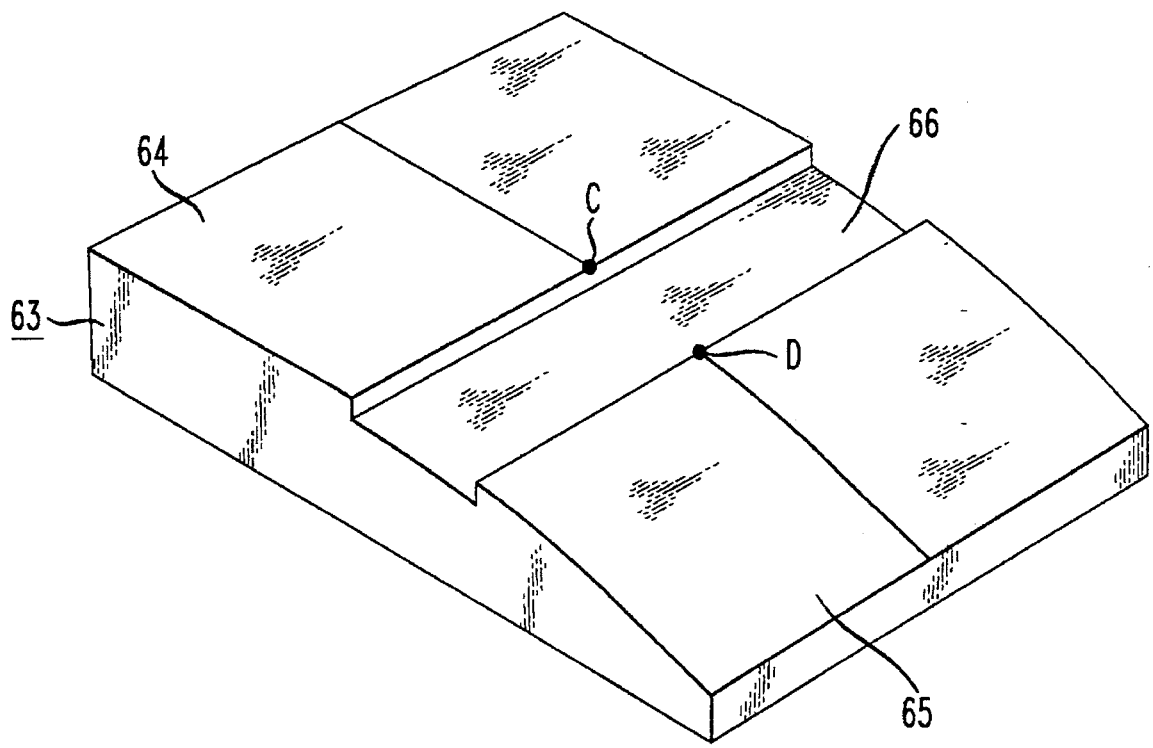
FIG. 7 shows a perspective view of the support shown in FIG. 6, which is used to support the frequency routing device while curvature is imparted to the optical grating.

FIG. 6 shows a cross-sectional view of the arrangement of FIG. 5 taken along line 3—3. FIG. 6 also shows an example of a support 63 that supports the arrangement while the appropriate curvature is imparted to the grating 55. In FIG. 6 the wafer 50 is shown after the requisite curvature has been provided. The support 63 is configured so that it does not contact the portion of the wafer 50 that is to be curved, by employing, for example, a cut-out region 66, thus ensuring that no external loads are supplied to the region of the grating that is to undergo the bending process. As seen in the perspective view of the support 63 shown in FIG. 7, the support has two planar surfaces 64 and 65 for supporting the portions of substrate 50 that contact rigid elements 51 and 52, respectively. That is, the two portions of the substrate 50 that are to remain planar are sandwiched between element 51 and surface 64 and element 52 and surface 65, respectively. In the particular orientation of FIG. 6, the surface 64 extends in a substantially horizontal direction while the surface 65 extends at an angle $\theta_O$ below the horizontal. The planes in which the surfaces 64 and 65 reside intersect along a vertex line indicated in FIG. 6 by point P.

In FIG. 6, $x_o$ denotes the distance between the elements 51 and 52 along the in-plane transverse direction defined by line A-B before curvature is imparted and x denotes the distance to any point on this axis with its origin (located at point A) coincident with the longest waveguide in the grating, as shown in FIG. 4. By fixing the portion of substrate 50 that contacts rigid element 51 onto surface 64 of the support 63 and applying downward pressure on surface 52 until it contacts surface 65, the substrate 50 will be curved through an angle $\theta_O$. Recognizing that the curvature imparted to the optical grating will vary linearly with distance x, the curvature may be expressed as:

$$C(x) = (C_A - C_B) X / X_O \qquad (3)$$

where $C_A$ and $C_B$ are determined by the boundary conditions imposed on the grating at x=0 and $x=x_O$, respectively. Assuming that the angles involved are relatively small, it can be shown from geometrical considerations that $$C_A = 2 \frac{\tan\theta_o}{x_o^2} (3d_o - x_o) \qquad (4)$$

$$C_A = 2 \frac{\tan\theta_o}{x_o^2} (2x_o - 3d_o) \qquad (5)$$

where $\theta_O$ as defined above is the angle through which the grating is curved and $d_O$ is the distance from vertex point P to point B (i.e., the point along line A-B traversing the shortest waveguide $39_1$). Of particular interest is the case where $C_B=0$ (i.e., no curvature is imparted to the shortest waveguide in the grating). In this case the above equations become:

$$\tan(\theta_O) = C_A x_o / 2 \qquad (6)$$

$$d_O = 2x_o / 3 \qquad (7)$$

Accordingly, by curving the grating in this manner with rigid elements 51 and 52 and support 63, zero curvature can be produced at point B, a linearly varying curvature is produced between points A and B, and any desired curvature $C_A$ may be applied at point A.

The above-described invention provides a technique for reducing or even eliminating the polarization shift that occurs in integrated optical gratings. It will be understood that the particular methods described are only illustrative of the principles of the present invention, and that various modifications could be made by those skilled in the art without departing from the spirit and scope of the present invention, which is limited only by the claims which follow. For example, while it is often desirable to impart curvature along the symmetry axis of the grating such as indicated by line A-B in FIG. 4, it may be desirable in some applications to impart curvature along an in-plane transverse direction that is not coincident with the symmetry axis of the grating.

I claim:

1. A method for reducing the polarization shift between different modes of an optical signal propagating in an optical grating having a plurality of waveguides initially on a common surface that extends on an initial plane, said method comprising the step of:

forming a curved surface from the common surface by imparting curvature to the optical grating along a line that traverses the plurality of waveguides in a direction that is substantially perpendicular to the direction in which the optical signal propagates, said curvature varying in a nonuniform manner along said line.

2. The method of claim 1 wherein said curvature varies in a substantially linear manner along said line.

3. The method of claim 1 wherein said curvature substantially eliminates said polarization shift.

4. The method of claim 1 wherein said line along which said curvature is imparted defines a symmetry axis of the optical grating.

5. The method of claim 1 wherein the step of imparting curvature comprises the step of flexing the optical grating at two contact points respectively located near a longest and shortest of said plurality of waveguides.

6. The method of claim 5 wherein the step of flexing the optical grating is performed without substantially exerting an external load on the optical grating along a line between said two contact points.

7. The method of claim 1 wherein said optical grating is a component in a frequency routing device.

8. The method of claim 6 wherein said curvature imparted to said shortest of said plurality of waveguides is substantially equal to zero.

9. The method of claim 1 wherein said optical grating is fabricated from a silicon-based material.

10. An optical apparatus comprising:

at least one input waveguide;

a first free space region connected to the at least one waveguide;

a first plurality of waveguides connected to the first free space region;

an optical grating connected to the first plurality of waveguides comprising a plurality of unequal length waveguides;

a second plurality of waveguides connected to the optical grating;

a second free space region connected to the second plurality of waveguides; and at least one output waveguide connected to the second free space region; and wherein said optical grating has a curved surface formed from a common surface that extended on an initial plane, said optical grating further having a nonuniform curvature along a line that traverses the plurality of waveguides in a direction that is substantially perpendicular to the direction in which optical signals propagate, said curvature varying in a nonuniform manner along said line.

* * * * *